United States Patent
Behnke et al.

(10) Patent No.: US 8,814,640 B2
(45) Date of Patent: Aug. 26, 2014

(54) HARVESTING DEVICE AND COLLECTING CONTAINER WITH IMPROVED FILLING DEVICE

(75) Inventors: Willi Behnke, Steinhagen (DE); Norbert Diekhans, Guetersloh (DE); Jochen Huster, Guetersloh (DE); Thilo Krause, Glinde (DE); Bastian Kriebel, Muenster (DE); Frank Claussen, Greffen (DE); Markus Brune, Harsewinkel (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 0 days.

(21) Appl. No.: 13/465,204

(22) Filed: May 7, 2012

(65) Prior Publication Data
US 2012/0302299 A1 Nov. 29, 2012

(30) Foreign Application Priority Data
May 25, 2011 (DE) .......................... 10 2011 050 629

(51) Int. Cl.
*A01D 17/02* (2006.01)
*A01F 12/46* (2006.01)
*B65G 67/22* (2006.01)
*A01B 69/04* (2006.01)
*A01D 43/07* (2006.01)

(52) U.S. Cl.
CPC .............. *B65G 67/22* (2013.01); *A01B 69/008* (2013.01); *A01D 43/07* (2013.01)
USPC ........................................... 460/114; 701/50

(58) Field of Classification Search
USPC ........ 701/50, 23, 24, 213, 215; 141/231, 198, 141/250, 311 R, 279; 414/397, 343, 800, 414/505; 460/114, 113, 6
See application file for complete search history.

(56) References Cited

U.S. PATENT DOCUMENTS

| | | | | |
|---|---|---|---|---|
| 4,008,819 A | * | 2/1977 | Hanaway | 414/505 |
| 4,029,228 A | * | 6/1977 | Shaver | 414/505 |
| 5,575,316 A | * | 11/1996 | Pollklas | 141/198 |
| 5,749,783 A | * | 5/1998 | Pollklas | 460/119 |
| 6,097,425 A | * | 8/2000 | Behnke et al. | 348/89 |
| 6,247,510 B1 | * | 6/2001 | Diekhans et al. | 141/231 |
| 6,587,772 B2 | * | 7/2003 | Behnke | 701/50 |
| 6,594,979 B2 | * | 7/2003 | Krone et al. | 56/16.6 |

(Continued)

FOREIGN PATENT DOCUMENTS

| | | |
|---|---|---|
| EP | 1 219 153 | 7/2002 |
| EP | 1 645 178 | 4/2006 |
| EP | 2 165 590 | 3/2010 |
| EP | 2 245 916 | 11/2010 |

*Primary Examiner* — Árpád Fábián-Kovács
(74) *Attorney, Agent, or Firm* — Michael J. Striker

(57) ABSTRACT

A harvesting system includes a self-propelled harvesting machine and a drivable collecting container equipped with a drive unit, which can be positioned relative to the harvesting machine and moved in parallel therewith. Crop is fed directly or indirectly to the collecting container during harvesting operation from the harvesting machine using a feed pipe equipped with an outlet chute. The collecting container is equipped with a device for loading it with crop in a uniform manner. The collecting container is moved in a constant position relative to the harvesting machine by way of a control device while the crop is being conveyed. The collecting container is preferably a filling device, by way of which uniform distribution of the crop in the collecting container (8) can be attained.

14 Claims, 6 Drawing Sheets

(56) References Cited

U.S. PATENT DOCUMENTS

Figure 1:
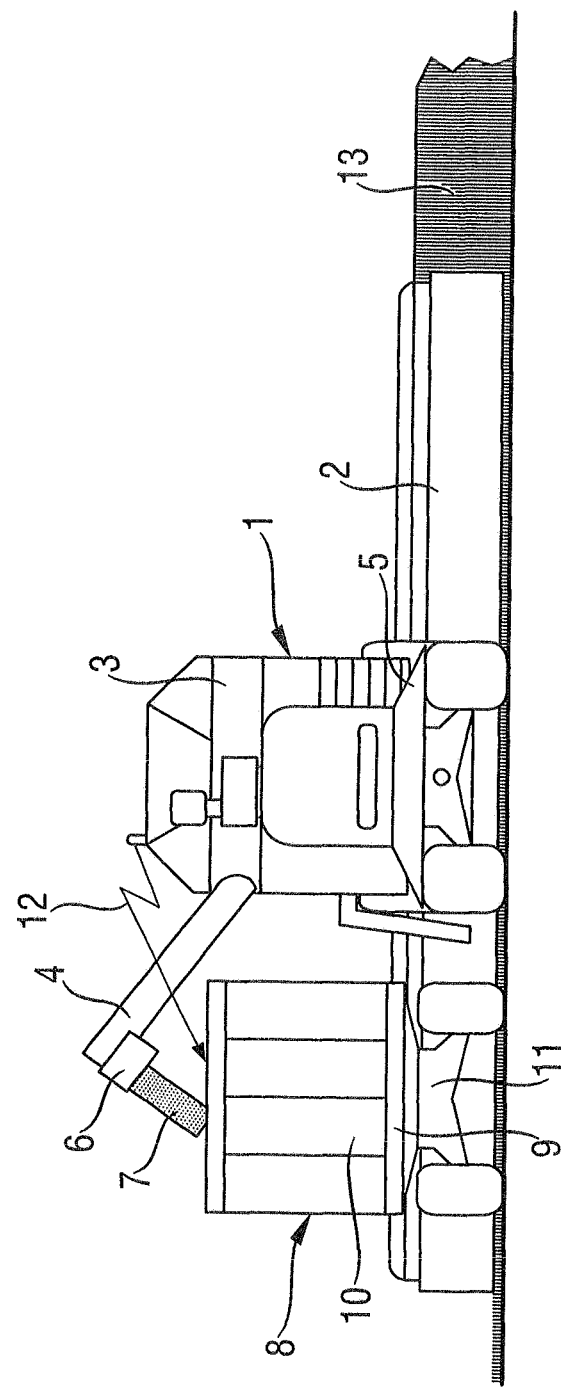

| | | | |
|---|---|---|---|
| 6,638,159 B2 * | 10/2003 | Krone et al. | 460/114 |
| 6,682,416 B2 * | 1/2004 | Behnke et al. | 460/114 |
| 6,932,554 B2 * | 8/2005 | Isfort et al. | 414/397 |
| 6,943,824 B2 * | 9/2005 | Alexia et al. | 348/89 |
| 6,994,623 B2 * | 2/2006 | Isfort et al. | 460/114 |
| 7,277,784 B2 * | 10/2007 | Weiss | 701/50 |
| 7,537,519 B2 | 5/2009 | Huster et al. | |
| 7,756,624 B2 * | 7/2010 | Diekhans et al. | 701/50 |
| 7,877,181 B2 * | 1/2011 | Chervenka et al. | 701/50 |
| 8,060,283 B2 * | 11/2011 | Mott et al. | 701/50 |
| 8,126,620 B2 | 2/2012 | Ringwald et al. | |
| 8,145,393 B2 * | 3/2012 | Foster et al. | 701/50 |
| 8,160,765 B2 * | 4/2012 | Morselli et al. | 701/25 |
| 8,180,534 B2 | 5/2012 | Burke et al. | |
| 8,306,727 B2 * | 11/2012 | Morselli et al. | 701/300 |
| 8,380,401 B2 * | 2/2013 | Pighi et al. | 701/50 |
| 2002/0083695 A1 | 7/2002 | Behnke et al. | |
| 2006/0047418 A1 * | 3/2006 | Metzler et al. | 701/207 |
| 2006/0094487 A1 * | 5/2006 | Huster et al. | 460/114 |
| 2006/0271262 A1 * | 11/2006 | McLain, III | 701/50 |
| 2007/0037621 A1 * | 2/2007 | Isfort | 460/114 |
| 2007/0135190 A1 * | 6/2007 | Diekhans et al. | 460/1 |
| 2010/0070144 A1 * | 3/2010 | Burke et al. | 701/50 |
| 2010/0274452 A1 * | 10/2010 | Ringwald et al. | 701/50 |
| 2011/0066337 A1 * | 3/2011 | Kormann | 701/50 |
| 2012/0029732 A1 * | 2/2012 | Meyer | 701/2 |
| 2012/0215394 A1 * | 8/2012 | Wang et al. | 701/24 |

* cited by examiner

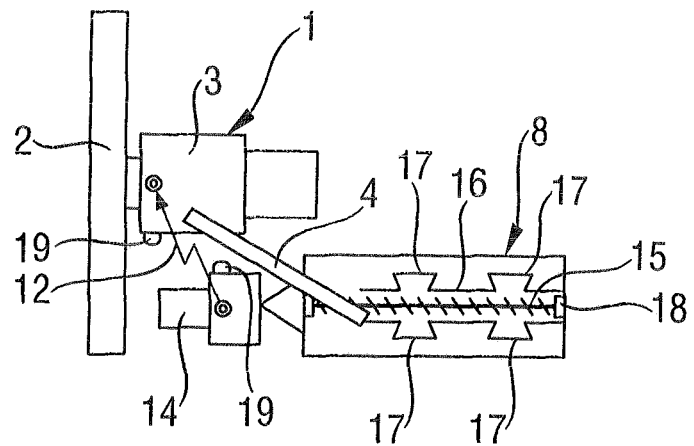
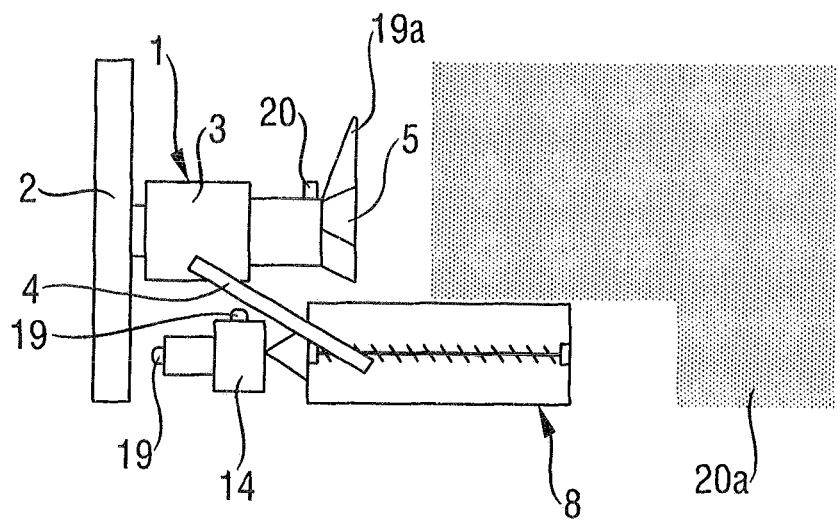
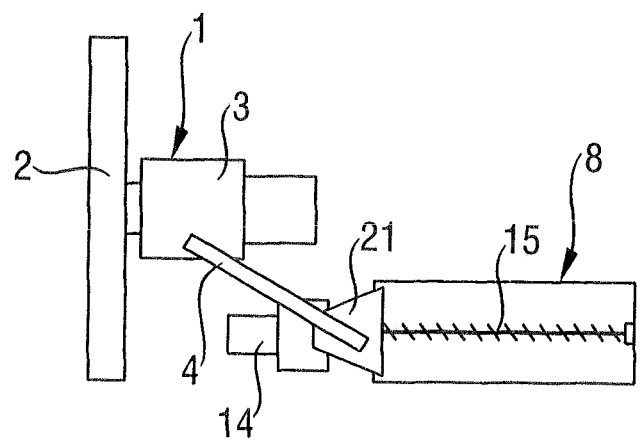

HARVESTING DEVICE AND COLLECTING CONTAINER WITH IMPROVED FILLING DEVICE

CROSS-REFERENCE TO A RELATED APPLICATION

The invention described and claimed hereinbelow is also described in German Patent Application DE 10 2011 050629.2, filed on May 25, 2011. The German Patent Application, whose subject matter is incorporated by reference herein, provides the basis for a claim of priority of invention under 35 U.S.C. 119(a)-(d).

BACKGROUND OF THE INVENTION

The invention relates to a system including a self-propelled harvesting machine and a drivable collecting container equipped with a drive unit in which the collecting container is positionable relative to the harvesting machine and moveable in parallel therewith. Crop can be fed directly or indirectly to the collecting container from the harvesting machine during the harvesting operation by way of a feed pipe equipped with an outlet chute, having a device for loading the collecting container in a uniform manner. The invention also relates to a method for unloading crop stored in a grain tank of a self-propelled combine harvester into a drivable collecting container equipped with a drive unit, where the collecting container is positionable relative to the combine harvester and moveable parallel thereto while the crop is fed into the collecting container directly or indirectly by way of a grain tank discharge pipe equipped with an outlet chute, simultaneous with the harvesting operation.

In the initial stages of technical development, harvesting machines in the form of combine harvesters or forage harvesters were usually not equipped with a separate drive and, instead, were drawn by a tractor and driven by way of the P.T.O. shaft thereof. Since then, nearly all combine harvesters used to harvest grain, rapeseed or corn are designed as self-propelled harvesting machines. High-performance forage harvesters, as self-propelled harvesting machines used by large-scale operations or contractors, also comprise a separate drive unit.

In farming, there is only a relatively short period of time available each year for harvesting grain and rapeseed, namely that period of time in which the stalk crop has reached a certain level of maturity for attaining a relatively good harvesting result. In addition, a certain moisture content must not be exceeded in order to save drying costs, which can have a considerable effect on the prices that can be obtained. As a result, highly efficient harvesting machines, such as combine harvesters having a higher rate of work, are used, the front harvesting attachment of which is designed with a large working width, said front harvesting attachment being in the form of a grain or rapeseed cutting mechanism or a corn picker.

This increase in the working width of the front harvesting attachment and a corresponding increase in the output of the threshing mechanism result in a large quantity of crop accumulating in the grain tank within a short time interval. The capacity of the grain tank would likewise need to be increased considerably, to avoid having to interrupt the harvesting procedure at short time intervals and move one of possibly several collecting containers positioned on the field in the direction thereof in order to transfer the crop. Increasing the capacity of the grain tank accordingly and storing the maximum quantity of grain would result in a considerable increase in the weight of said self-propelled harvesting machine. The disadvantage of a related weight increase is the ground compression caused by the tires of the combine harvester on the field, which has an unfavorable effect on the optimum soil condition because plant growth is reduced considerably in these extremely compressed tracks, since the compression of the ground greatly restricts the circulation of air and water. In addition, if the capacity of the grain tank were not increased, the intervals for unloading the crop from the grain tank into the particular collecting containers would be greatly shortened, thereby making it necessary to interrupt the harvesting process very frequently, which, in sum, results in a relatively long standstill time of the combine harvester.

For this reason, in the case of high-performance combine harvesters comprising a harvesting front attachment having a correspondingly large working width, the transfer of crop from the grain tank into the collecting container, i.e. the grain tank unloading process, takes place simultaneously with the harvesting process. This means that, in a phase in which the grain tank of the combine harvester has reached the maximum fill level thereof, the collecting container—which is likewise designed to be self-propelled or can be moved using a tractor—assumes a position next to the combine harvester, in which the crop is conveyed into the collecting container by way of a feed pipe equipped with an outlet chute.

In this context, systems are known, in which the driver of the combine harvester not only monitors all the functions of the combine harvester and makes the necessary adjustment procedures thereon; from his driver's cab, the driver also requests the collecting container located closest to the harvesting machine and controls it in such a way that the collecting container travels parallel to the harvesting machine. The ground speed of the collecting container is therefore matched to that of the harvesting machine. Once the collecting container has been moved into a position relative to the combine harvester in this manner, the crop is transferred or discharged using an auger for unloading the grain tank, which is disposed in a feed pipe swivelled outward accordingly.

While the crop is being fed to the collecting container, this transfer procedure must be monitored continuously to ensure that grain losses do not occur during this process. It is possible, for example, for the outlet chute of the feed pipe to assume a position relative to the collecting container, in which components of the crop drop next to the collecting container. This problem could possibly also occur if, due to weather conditions, a strong cross wind blows grains out of the crop stream and conveys them next to the collecting container. In addition, the entire volume of the collecting container should be utilized, if possible, that is, the crop must be distributed in the collecting container in an optimal manner. Moreover, the filling of the collecting container must be stopped when a maximum level of the collected material has been reached in the individual regions of the collecting container since parts of the crop would otherwise fall to the ground at the end of the filling process or when the collecting container is subsequently hauled away. It is also important for the driver to concentrate primarily on the cutting and threshing process, when harvesting grain, for example; that is, the view of the harvesting front attachment plays an important role. If he must also monitor the position of the collecting container and the grain tank unloading process, however, he becomes too distracted from this main task. Moreover, his view of the collecting container is often restricted by dust formation during the threshing process and the grain tank unloading process, thereby leaving him with hardly any options for fully monitoring the loading of the crop into the collecting container.

The aforementioned problems apply for a harvesting machine equipped with a threshing mechanism and for a self-propelled forage harvester or corn harvester, wherein the crop is not stored for the interim in a tank on the harvesting machine, and is instead ejected directly by way of the feed pipe in the direction of the collecting tank. Exact positioning of the collecting containers, which must constantly travel behind or next to the harvesting machine, is crucial in this case as well.

A harvesting device comprising a self-propelled harvesting machine and a driveable collecting container comprising a drive unit is known from EP 2 245 916 A1. The collecting container, which is moved by a tractor parallel to the harvesting machine, should be loaded in a uniform manner by changing the position of the collecting container with respect to the outlet chute of the feed pipe in the direction of travel. This change in the relative position of the collecting container with respect to the harvesting machine, and maintenance of a parallel driving track are attained by way of a GPS system. Moreover, the outlet chute is designed to be swivelable with respect to the feed pipe, and is adjusted by way of the automatic control system such that the ejected crop lands specifically in the collecting container without grain losses.

In addition, EP 1 219 153 A2 makes known a system comprising a self-propelled harvesting machine and a driveable collecting container, in the case of which relative positions of the harvesting machine and the collecting container should likewise be shifted with respect to one another, depending on GPS monitoring and radio signals, in such a manner that the collecting container is loaded completely in accordance with the capacity thereof.

SUMMARY OF THE INVENTION

The present invention provides a system and method that overcome shortcomings of the known arts, that are reliable in performance and that prevent a loss of portions of the crop by assuring transfer of crop from the harvesting machine to the collecting container in such as way that completely fills particular collecting container is completely filled, under all harvesting conditions.

In an embodiment, the system includes a harvesting machine and collecting container moved in a constant position relative to the harvesting machine by way of a control device while the crop is being conveyed. The collecting container comprises a filling device, by way of which uniform distribution of the crop in the collecting container is attained. The filling device is provided on the collecting container. The collecting container is moved parallel to the harvesting machine while maintaining a constant safe distance from the harvesting machine and at a ground speed that corresponds to the ground speed of the harvesting machine. A corresponding outlet chute of the feed pipe assumes a fixed position relative to an inlet of the filling device at the onset of the transfer of the crop from the harvesting machine.

During operation, the collecting container is moved out of the waiting position thereof toward the harvesting machine at a high ground speed and then matches its own ground speed to that of the harvesting machine while traveling in parallel as soon as the outlet chute has assumed the intended position thereof. The simple process provides for avoidance of problems in assigning the collecting container to the harvesting machine and in filling the collecting container in a uniform manner.

In contrast, according to publications EP 2 245 916 A1 and EP 1 219 153 A2 cited in the prior art, the position of the collecting container with respect to the harvesting machine is changed continuously to thereby attain uniform distribution of the crop in the collecting container. But using this known technique runs the risk that the fill level of the collecting container is exceeded in certain regions thereof, and parts of the crop therefore drop onto the field and become lost as harvesting yield.

In another embodiment, e invention, the harvesting machine is in a form of a self-propelled combine harvester, wherein the feed pipe is designed as a grain tank discharge pipe that extends from a grain tank of the combine harvester. The fill level of the grain tank of the combine harvester, which is used for intermediate storage, is continuously monitored, and a collecting container located closest to the combine harvester is automatically requested based on the monitoring. The collecting container is then brought into the position by a pulling machine in the form of a tractor for the subsequent unloading of the crop. The applicable collecting container also can be moved toward the combine harvester, which is engaged in the harvesting operation, initially in a manual manner. Thereafter, the control device brings the collecting container into the position thereof intended for the grain tank unloading process and maintains this position with respect to the combine harvester, which is traveling.

To this end, and possibly also for an automatic approach by the collecting container to the combine harvester, the harvesting machine, e.g., combine harvester and the drive unit of the driveable collecting container is equipped with a navigation system. The navigation system enables that both the harvesting machine and driveable collecting container are held in a constant position relative to one another while the crop is being conveyed. The solution is preferably based on GPS signals and radio systems, by way of which a so-called "electronic tow bar" can be produced. For safety reasons, a supplemental system can be provided, which maintains the positioning of the vehicles with respect to one another if the GPS or radio transmission is disrupted. For example, the two vehicle positions can be additionally monitored and the position of the collecting container can therefore be corrected by way of distance sensors on the collecting container or the harvesting machine, which intervene if the normal control systems fail. These distance sensors would adapt the ground speed and correct the steering angle at the drive unit of the collecting container.

Moreover, a front harvesting attachment disposed on the combine harvester includes a lateral extension extending beyond the combine harvester on both sides, wherein the collecting container assumes a position substantially within the extension of the front harvesting attachment during conveyance of the crop by way of the grain tank discharge pipe. The front harvesting attachment (for example, a header for harvesting grain or rapeseed, or corn pickers) extends well beyond the remaining width of the combine harvester. In the case of combine harvesters, the grain tank discharge pipe is typically provided on the left side as viewed in the direction of travel. Consequently, the collecting container, which is preferably drawn by a tractor, moves within the lateral extension of the front harvesting attachment during a grain tank unloading process.

Harvesting conditions exist, however, in which it is advantageous for the collecting container to be moved within the extension of the front harvesting attachment. For example, if a grain tank unloading process should become necessary during the clearing process while mowing the first path, the tractor and the collecting container, if they are moving outside of the extension of the front harvesting attachment, would be compelled to travel in the stalk crop that has not yet been harvested, or on an adjacent field. This would result in unnecessary tracks and, therefore, crop losses. The inventive system and method avoid damage of this type in the unharvested stalk crop or in a stand on an adjacent property because the collecting container, which is drawn by the tractor, is moved along a path that has already been harvested by the combine harvester. Similar conditions result when harvesting is carried out only at a stand edge on relatively long paths, and therefore the grain tank discharge pipe is located on the stand side on every other pass. In addition, when long paths are involved, effort should be made, in part, to avoid mowing long stretches on the headland of the related path. The reason is that clearing must be carried out repeatedly within the stand, although a path would likewise not be available for travel by the collecting container if it could not be moved within the extension of the front harvesting attachment.

Since it is now hardly possible to use the straw and chaff accumulated during a harvesting process for special purposes as feed or scatter material, nearly all combine harvesters are equipped with a chopper mounted at the straw and chaff outlet. The chopper ensures that these components are adequately fragmentized and distributed so they can be worked into the top ground layer in a uniform manner during subsequent soil management, to attain optimum soil conditions.

According to the invention, the combine harvester may comprise a related chopper having an adjustable guide device for adjusting the width of straw and chaff distribution. On the basis of a signal transmitted from the collecting container, the guide device is moved automatically into a position in which the width of the distribution is reduced on one side such that it lies outside of a driving path of the collecting container. The corresponding guide devices of the chopper, which are preferably hydraulically displaceable, therefore distribute the fragmentized straw and chaff in an asymmetrical manner. This adjustment of the guide device of the chopper, which preferably takes place automatically, is implemented when the driveable collecting container is moved in the position thereof next to the combine harvester. After the grain tank has been emptied and the collecting container has been removed, the guide device is returned to the normal distributing function thereof, and therefore straw and chaff are once more distributed across the entire working width of the combine harvester.

The chopped material is thereby prevented from collecting on the hauling container, thereby preventing the formation of accumulations or a swath of chopped material. These accumulations or chopped material swaths can create problems in the subsequent soil management and can form straw nests on the ground, which impair the development of optimum soil conditions at these points. In addition, if this adjustment of the guide device of the chopper were not carried out, the air would become loaded to a considerable extent with fine straw components and dust in the region of the collecting container, which can have an unfavorable effect on the grain tank unloading process and, when wind conditions are unfavorable, can even contaminate the crop located in the interior of the collecting container.

In another embodiment, the filling device of the collecting container comprises a longitudinal conveyor, which acts at least in the longitudinal direction of the collecting container. This longitudinal conveyor transports the crop fed to the collecting container in such a way that the crop can be distributed evenly in the collecting container until the maximum fill volume thereof has been reached. The longitudinal conveyor can be in the form of at least one conveyor auger or a chain conveyor. Other types of longitudinal conveyors can also be used, however, which distribute the crop continuously or in intervals.

Moreover, the longitudinal conveyor can be disposed in a conveyor trough, wherein different outlet regions having different outlet cross sections can be adjusted on the conveyor trough. These adjustable outlet cross sections or, alternatively thereto, guide elements ensure that the crop is distributed evenly, are adjusted by way of measurement devices that monitor the fill level in the collecting container or depending on other parameters. For example, the adjustment function could be influenced if the combine harvester is unloaded at a slant on an incline, to ensure that the collecting container does not become loaded on one side.

The crop can be fed by way of the outlet chutes of the grain tank discharge pipe in the center with respect to the longitudinal extension of the collecting container. In this case, the filling device comprises at least two longitudinal conveyors acting in opposing conveying directions. Alternatively, the crop can also be fed at one end of the collecting container, in which case at least one longitudinal conveyor acting in one conveying direction is provided.

According to a further embodiment of the invention, the collecting container comprises a loading funnel at one end thereof, from which the at least one longitudinal conveyor extends. The loading funnel can extend in the direction of the combine harvester beyond the collecting container, which preferably has a rectangular main surface. The filling device is preferably configured as a separate component that can be placed onto the collecting container, thereby enabling the driveable collecting container to be used for other agricultural hauling work as well after the filling device is easily detached.

Moreover, a device carrier, preferably a Trac vehicle, functions as the drive unit for the collecting container, which has rear installation space and a rear loading surface. An intermediate storage unit is disposed on said rear installation space and filled by way of the grain tank discharge pipe of the combine harvester. In turn, an intermediate conveyor extends from the intermediate storage unit, which leads into an inlet region of the longitudinal conveyor disposed in the collecting container. Preferably, the intermediate conveyor is guided at the intermediate storage unit in a swivelable manner, enabling the outlet of the intermediate conveyor to maintain a constant position at the collecting container even if the device carrier makes steering motions.

In addition, sensors for monitoring a fill level are disposed in the upper edge region of the collecting container, by way of which the longitudinal conveyor or conveyors can be controlled. It is expedient to assign the sensors to different sectors of the collecting container to permit adjustment of the longitudinal conveyor or the devices for changing outlet cross sections in the conveyor trough or corresponding guide devices, on the basis of individual data transmitted by the sensors to a central unit, such that the collecting container is filled in a uniform manner up to a maximum fill level. In addition, a camera is mounted at the feed pipe of the harvesting machine or at the outlet chute thereof. The camera is connected to a monitor provided in a cab of the harvesting machine. By way of this monitor, the driver of the harvesting machine can perform a control function in addition to the intended automatic monitoring functions. The monitor permits detection of any problems and, if any are found, manual intervention may be carried out.

In addition, the harvesting device may include, in a feed region of the longitudinal conveyor, an ultrasonic sensor that monitors the entry of the crop from the outlet chute into the longitudinal conveyor. The ultrasonic sensor is mounted at the collecting container and connected to a monitor or a navigation system controlling the position of the collecting container. This device may be provided alternatively to the above-described camera, or in combination with the camera. In addition to positioning the collecting container with respect to the combine harvester by way of the navigation system, the ultrasonic sensor performs an additional monitoring function that implements an automatic correction or prompts the driver of the harvesting machine to make an additional correction.

The invention also relates to a method for unloading crop stored in a grain tank of a self-propelled combine harvester into a drivable collecting container equipped with a drive unit, wherein the collecting container is positioned relative to the combine harvester and is moved in parallel thereto while the crop is fed to the collecting container directly or indirectly by way of a feed pipe equipped with an outlet chute, simultaneously with the harvesting operation. To unload the crop, the collecting container is moved by way of a control device in a constant position relative to the harvesting machine, behind a front harvesting attachment or next to a front harvesting attachment, in which the outlet chute is oriented toward an inlet region of a longitudinal conveyor provided in the collecting container.

The method carries with it the advantages described above in conjunction with the system, enabling harvesting grain, corn, rapeseed or other legumes with little personal effort since the driver of the combine harvester can concentrate mainly on the operation of the combine harvester while the rest of the process for emptying the grain tank takes place automatically to the greatest extent possible. It is only necessary for additional personnel to replace the filled collecting container with an empty collecting container and haul it away. Within the scope of this method, the spreading width of the chopper mounted on the combine harvester is varied, and sensors are used to monitor a uniform and maximum filling of the collecting container.

Using the method (and system), the particular position of the combine harvester and the collecting container is determined by way of one or two navigation systems that communicate with each other, wherein, alternatively thereto, a radio link between the combine harvester and the collecting container can also determine a position of the collecting container. The method performs additional monitoring function by which distance sensors are provided that monitor the particular distance between the combine harvester and the collecting container. If this distance is exceeded or undershot, a corrective steering procedure is triggered at the tractor pulling the collecting container. The invention further envisions that the longitudinal conveyor is disposed in the region of the base of the collecting container, for example in the form of a floor conveyor or as at least one feed auger disposed at the bottom.

BRIEF DESCRIPTION OF THE DRAWING FIGURES

Figure 5:
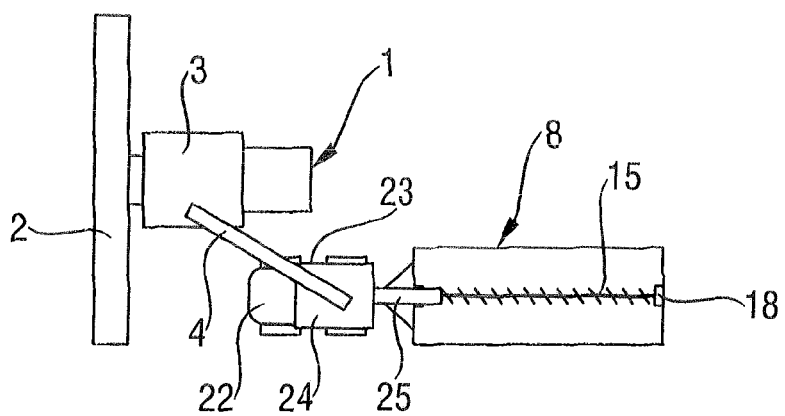
Figure 6:
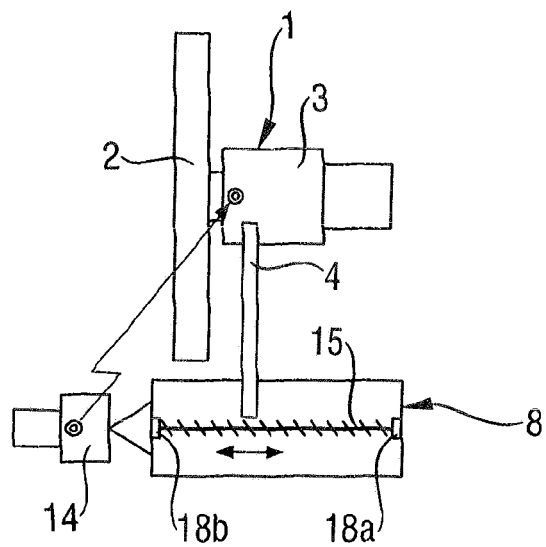
Figure 7:
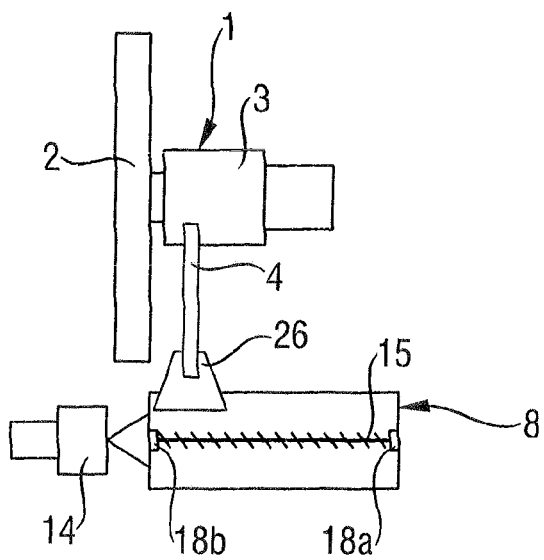
Figure 8:
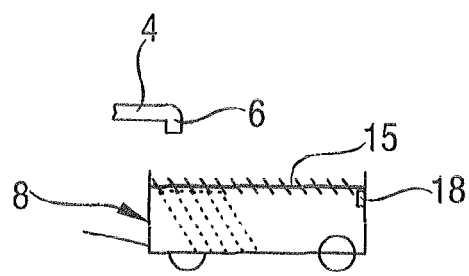
Figure 9:
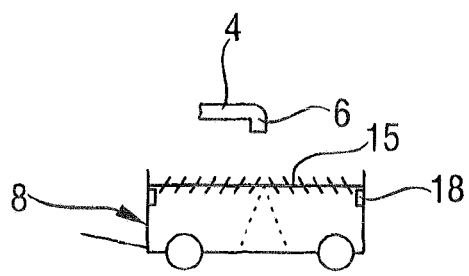
Figure 10:
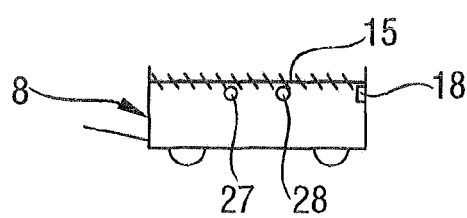
Figure 11:
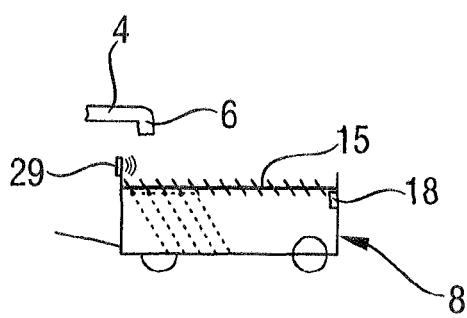
Figure 12:
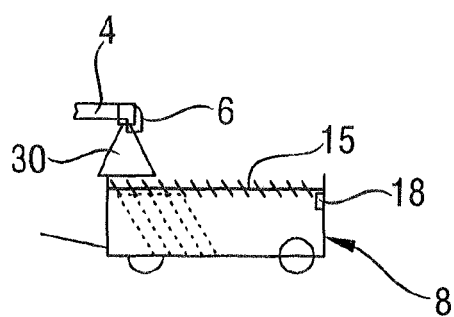
Figure 13:
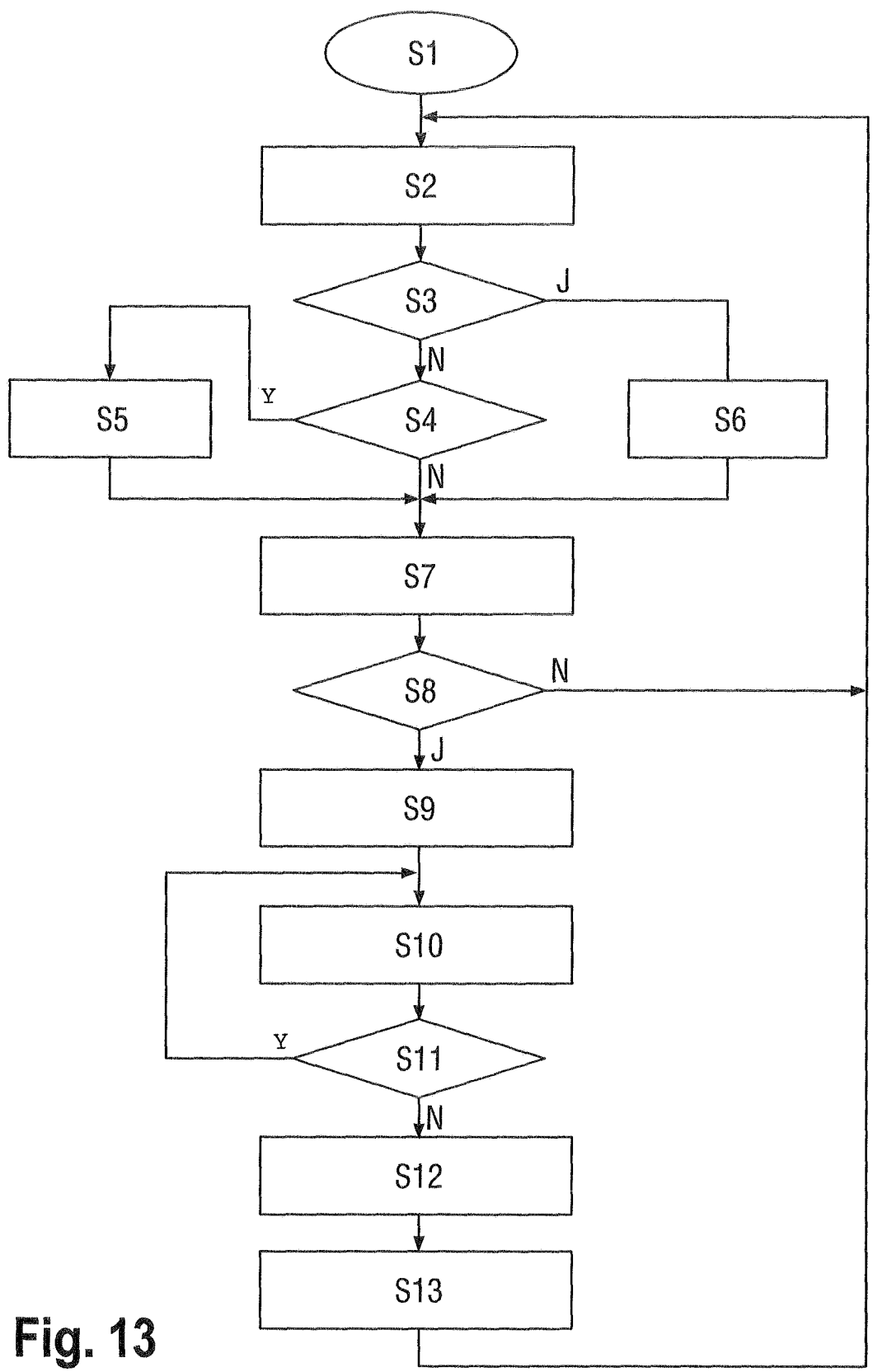
Figure 14:
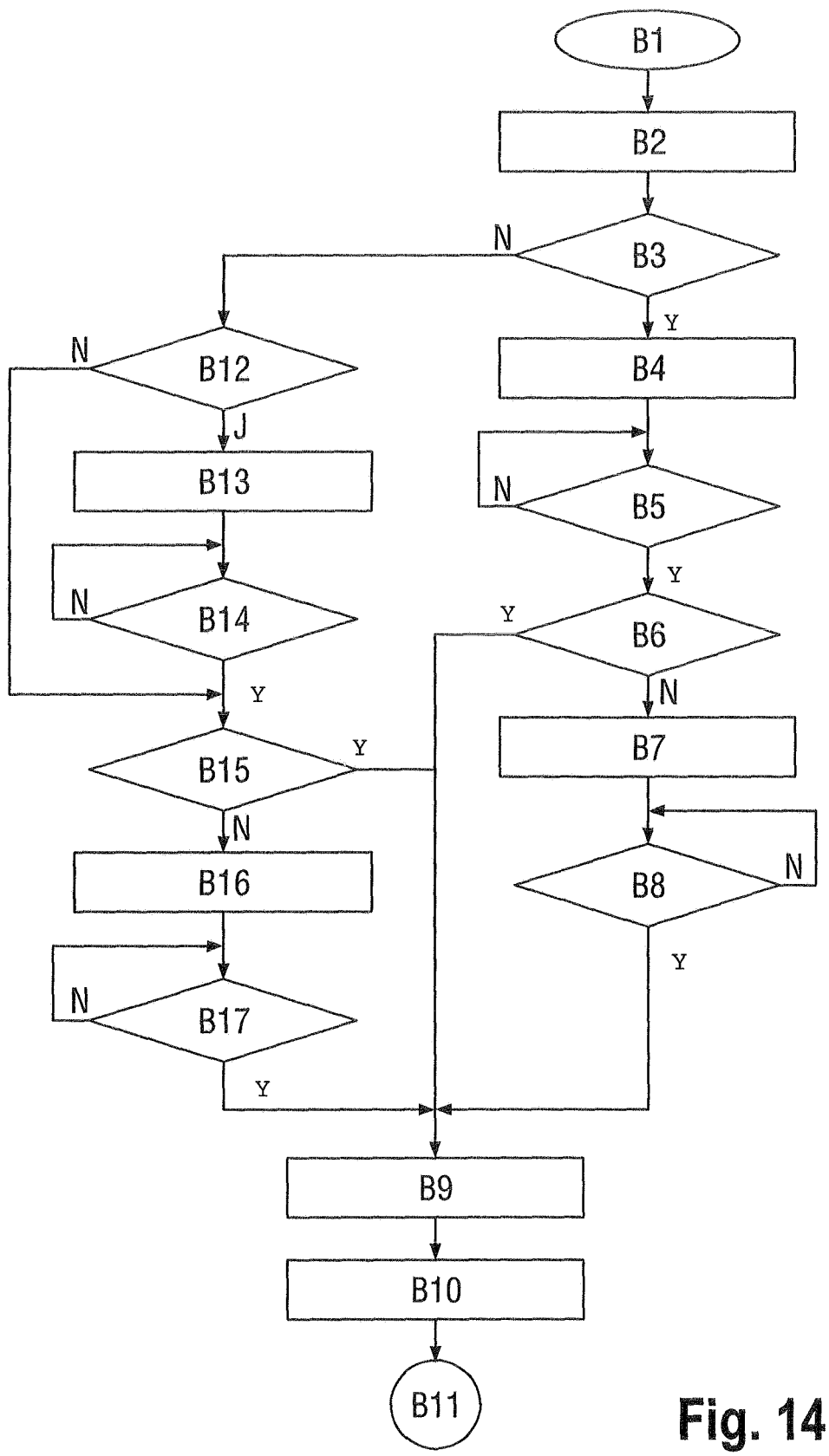

Further features and advantages of the invention will become apparent from the description of embodiments that follows, with reference to the attached figures. Shown are:

FIG. 1 a rear view of a self-propelled combine harvester and a driveable collecting container positioned next thereto;

FIG. 2 schematically, a scaled-down top view of the harvesting device according to FIG. 1;

FIG. 3 schematically, in a top view, a harvesting device in which the self-propelled combine harvester is equipped with a chopper that places the chopped material next to the driving track of the collecting container;

FIG. 4 schematically, in a top view, a harvesting device in which the crop is conveyed into a front loading funnel of the collecting container;

FIG. 5 schematically, in a top view, a harvesting device in which the crop is conveyed onto an intermediate storage unit provided on a loading surface of a Trac vehicle drawing the collecting container;

FIG. 6 schematically, in a top view, a harvesting device in which the collecting container is moved parallel to the combine harvester, outside of the extension of a front harvesting attachment thereof;

FIG. 7 schematically, in a top view, a harvesting device in which the collecting container likewise moves parallel to the combine harvester, outside of the extension thereof, wherein the collecting container comprises a lateral loading funnel;

FIG. 8 a schematic side view of a collecting container equipped with a conveyor auger, with the crop being fed at the front end of the collecting container;

FIG. 9 a schematic depiction of a side view of a collecting container in which the crop is fed to a filling device in the central region of the collecting container;

FIG. 10 schematically, in a side view, a collecting container comprising sensors for monitoring the fill level of said collecting container;

FIG. 11 schematically, in a side view, a collecting container in which the feeding of the crop is monitored by way of an ultrasonic sensor;

FIG. 12 schematically, in a side view, a collecting container in which the feeding of the crop is monitored by way of a camera;

FIG. 14 a sequence of steps in the form of a flow chart for a method in which the crop collected in a grain tank of a combine harvester is unloaded into a collecting container; and FIG. 13 a sequence of steps in the form of a flow chart for a method in which the crop conveyed from a grain tank discharge pipe into a filling device is distributed in a collecting container until a specified maximum fill level is reached in the entire collecting container.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

In FIG. 1, reference numeral 1 designates a self-propelled combine harvester comprising a front harvesting attachment 2, which is preferably replaceable, in the front region thereof. The front harvesting attachment 2 has a relatively large working width and therefore extends beyond the width of the combine harvester 1 on both sides to a considerable extent, that is, beyond the width of the ground drive, the threshing mechanism, etc., thereof. The front harvesting attachment 2 is preferably a header for harvesting grain or rapeseed. Moreover, the combine harvester 1 comprises a grain tank 3 in the central region thereof, behind a driver's cab. A feed pipe extends from the grain tank in the form of a grain tank discharge pipe 4 on a left longitudinal side of the combine harvester 1, as viewed in the direction of travel. The grain tank discharge pipe 4 can be swiveled outwardly into the position for emptying the grain tank 3 depicted in FIG. 1. The grain tank discharge pipe 4 also can be transferred into a transport position of the combine harvester 1, in which it extends parallel to the longitudinal extension thereof.

Furthermore, the grain tank discharge pipe 4 comprises a conveyor auger in the interior thereof, which is used to empty the grain tank 3 and is not shown in greater detail. While grain is being harvested, straw and chaff travel by way of tray-type shakers and sieves, which are not shown in greater detail, to the rear end of the combine harvester 1 and into a chopper 5 disposed there, which is used to fragmentize and evenly distribute the straw and the chaff across a surface of the field harvested by the combine harvester 1, that is, onto the stubble. The grain tank discharge pipe 4 comprises an angled outlet chute 6, which redirects the crop conveyed through the grain tank discharge pipe 4 such that it reaches a collecting container 8 disposed next to the combine harvester 1 in the form of a crop stream 7.

The collecting container 8 has a closed base 9, a circumferential side panel 10, and individual side panels, and is equipped, at least partially, with an opening on the top side thereof. In addition, the driveable collecting container 8 is mounted on a ground drive, thereby enabling it to move parallel to the combine harvester 1 in a fixed position relative thereto during a grain tank unloading process, while the harvesting process continues. FIG. 1 shows that data are transmitted from the combine harvester 1 by way of a radio link 12 between the combine harvester 1 and a drive unit of the collecting container 8, which is not depicted in greater detail in FIG. 1. FIG. 1 also shows the still unharvested stalk crop stand 13 next to the front harvesting attachment 2. The same reference signs are used in the figures that follow for the devices and components explained in FIG. 1.

FIG. 2 shows substantially the same configuration as described above with reference to FIG. 1, although it is a highly schematic and smaller-scale depiction of the configuration in a top view. FIGS. 3 to 7 show depictions that are also highly schematicized, likewise in a top view.

FIG. 2 further shows that the collecting container 8 is drawn by a tractor 14, which therefore forms a direct drive unit of the collecting container 8. The tractor 14 is connected to the combine harvester 1 by way of the radio link 12 mentioned in conjunction with FIG. 1. In addition, the at least one combine harvester 1 includes a navigation system, by way of which the particular position of the combine harvester 1 is detected via GPS. The tractor 14 also comprises a navigation system, wherein these two systems are coordinated with one another in such a way that the combine harvester 1 and the collecting container 8 drawn by the tractor 14 move in constant positions relative to one another.

FIG. 2 also shows that the front harvesting attachment 2 of the combine harvester 1 extends therebeyond on both sides, and the collecting container 8 drawn by the tractor 14 moves behind this front harvesting attachment 2, that is, within the extension. While the harvesting process continues (e.g., while the stalk crop is mowed, threshed and prepared), the grain tank 3 is simultaneously emptied by way of the grain tank discharge pipe 4, which has been swiveled outward. In FIG. 2, the discharge pipe is shown terminated in the front region of the collecting container 8 and feeds the crop to a filling device designed as a conveyor auger 15 by way of an outlet chute 6 (not shown in FIG. 2).

The feeding takes place in the front region of the collecting container 8, and the conveyor auger 15, as a longitudinal conveyor, transports the crop into the other regions of the collecting container 8. The conveyor auger 15 is disposed within a conveyor trough 16, which as shown in FIG. 2, has a plurality of adjustable outlet regions 17. In the depiction, a sensor 18 for monitoring the fill level of the collecting container 8 is located at the rear end of the collecting container 8. In addition, distance sensors 19 are mounted on the combine harvester 1 and on the tractor 14. The distance sensors 19 perform an additional safety function independently of the control of the two vehicles 1 and 14 and 8 by way of the navigation system. That is, the distance sensors prevent a potential collision between the two vehicles 1 and 8 or 14, respectively.

The depiction according to FIG. 3 is substantially identical to that shown in FIG. 2, and therefore the same reference signs are used. In FIG. 3, the combine harvester 1 according to FIG. 1 is equipped with a chopper 5.

The chopper 5 comprises a guide device 19 for adjusting the distribution of straw and chaff behind the combine harvester. The guide device 19 is adjusted by way of an actuator 20 such that a spreading width 20a behind the combine harvester 1 can be reduced on one side. As shown in FIG. 3, the chopped components are applied onto the stubble only in a region that lies outside of the region traversed by the collecting container 8.

The configuration according to FIG. 4 differs from that shown in FIGS. 2 and 3 only in that a loading funnel 21 is provided in the front region of the collecting container 8, into which the grain tank discharge pipe 4 leads. In this case, the conveyor auger 15 extends from said loading funnel 21. FIG. 4 also shows that the loading funnel 21 is located in a region above a tow bar, by way of which the driveable collecting container 8 is coupled to the tractor 14.

According to FIG. 5, the driveable collecting container 8 is drawn by a Trac vehicle 22, the Trac vehicle 22 comprising a rear loading surface 23. An intermediate storage unit 24 is provided on the loading surface 23, from which the crop is conveyed by way of an intermediate conveyor 25 to the conveyor auger 15 disposed in the collecting container 8. There, the conveyor auger 15 distributes the crop in collecting container 8 in cooperation with guide devices that are not shown.

FIGS. 6 and 7 show a configuration in which the collecting container 8 likewise moves in a manner synchronized with the combine harvester 1. The collecting container 8, which is drawn by the tractor 14, is located outside the extension of the front harvesting attachment 2. The collecting container assumes this position with respect to the combine harvester only if mowing is not carried out in the entire stand or if the grain tank discharge pipe 4 is never located on the side of the unmowed stand.

According to FIG. 6, the grain tank discharge pipe 4 terminates in the center of the collecting container R and the at least one conveyor auger 15 therefore conveys in opposite directions in the collecting container 8. The conveyor auger 15 is divided, wherein the two parts are driven in different directions of rotation. The auger may comprise a shaft having opposing auger turning directions, and so, when the two sections rotate in the same direction, conveyance takes place in the direction of the two ends of the collecting container 8. According to FIG. 7, the crop is fed laterally in the front region of the collecting container 8, wherein a lateral loading funnel 26 is provided for this purpose. By way of said loading funnel 26 the crop reaches the inlet region of the conveyor auger 15.

In FIG. 8, as in FIG. 2, the crop is fed by way of the grain tank discharge pipe 4 and the outlet chute 6 thereof into the front region of the collecting container 8, wherein the conveyor auger 15 distributes the crop along the entire length of the collecting container 8. In FIG. 9, the crop is fed in the middle of the collecting container 8, as is the case in FIG. 6. In contrast to the configuration according to FIG. 6, however, the collecting container 8 and the tractor 14 is located within the extension of the front harvesting attachment 2.

According to FIG. 10, further sensors 27 and 28 for monitoring a fill level of the collecting container 8 in the central region thereof are disposed in the upper region of the collecting container 8, in order to obtain complete filling. According to FIGS. 11 and 12, the feeding of the crop to the conveyor auger 15 is monitored. To this end, an ultrasonic sensor 29 is provided. Ultrasonic sensor 29 monitors the crop stream 7 and reports malfunctions by way of the related electronic system to a monitor, which monitor is not depicted in greater detail but is disposed in the driver's cab of the combine harvester 1. According to FIG. 12, the same function can be performed by a camera 30 that transmits pertinent messages to the monitor by way of an image processing system.

FIG. 13 presents a flow chart depicting the related grain tank unloading process from the combine harvester 1 into the collecting container 8 and the required relative positioning of the combine harvester 1 and the tractor 14 or Trac vehicles 22 drawing a collecting container. After an automated grain tank unloading process is activated in method step S1, a determination is made in a method step S2 regarding the position in which the crop should be unloaded. That is, it is determined whether unloading occurs in a position behind the front harvesting attachment 2 according to method step A1, or next to the front harvesting attachment according to method step A2. It is also possible to deactivate this function. In the subsequent method step S3, it is also determined whether grain should be unloaded during operation of a chopper 5 when unloading takes place behind the front harvesting attachment 2, that is, according to A1. If so, the "yes" path after step S6 activates reduced distribution of chopped material on one side.

Method step S3 is followed by a method step S4 by way of a "no" path. If, according to method step S4, the grain tank discharge function is "off" or the collecting container 8 is traveling next to the front harvesting attachment 2, then normal chopping operation takes place by way of the "yes" path according to a method step S5. Next, according to method step S7, the status of the collecting container 8 and the combine harvester grain tank unloading process is determined. According to step S8, a check is carried out to determine whether a grain tank unloading process is released for the collecting container 8 and the combine harvester. If not, the system is reset by way of the "no" path, that is, the procedure starts over according to the method step S1 with the activation of the automated grain tank unloading process. By way of the "yes" path, the procedure is continued and, therefore, the grain tank unloading process is activated in method step S9.

In method step S10, the status of the collecting container 8 and the combine harvester grain tank unloading process is determined. A check is carried out in S11 to determine whether the grain tank unloading process has been released for the combine harvester 1 and the collecting container 8. If so, a pertinent message is transmitted by way of the "yes" path and the process is continued. If not, this message is transmitted by way of the "no" path and, consequently, the grain tank unloading process is halted in S12.

Different status messages may be generated/displayed in step S13. That is, "grain tank unloading process is off", "collecting container is full", "not in the grain tank discharge position" or "grain tank unloading process is interrupted", re displayed on a monitor in the driver's cab of the combine harvester 1 and/or the tractor 14 or the Trac vehicle 22. In this case, the entire procedure is reset to a position after the start of the automated grain tank unloading process, that is, after S1. Reference is also made specifically to the explanations in the list of reference signs with respect to the individual method steps.

FIG. 14 shows a flow chart for the filling of the collecting container 8, which relates to a filling of the collecting container 8 when feeding takes place in the central region thereof. First, according to B1, the automated filling procedure is activated, followed in B2 by auger conveyance from this region into the front region, position 2, of the collecting container 8. In this context a query takes place as to whether a fill level determined by a sensor does not yet register the "full" position when the conveying direction is toward the front, that is, position 1. If this is the case, then, in accordance with the "yes" path according to step B4, the direction of conveyance of the conveyor auger toward the front is activated, or this setting is retained. If this is not the case, a "no" path is activated, which will be described below.

Next, a query takes place in B5 as to whether the front fill level sensor signals a "full" fill level. If the maximum fill level has not yet been reached at the front, the "no" path leads to the filling being continued in the front region of the collecting container. If the maximum fill level has been reached in the front region, the "yes" path leads to the path being continued to B6, where a check is carried out by a further fill level sensor to determine whether a maximum fill level has also been reached in the rear region of the collecting container 8. If so, the "yes" path is activated, and operation of the conveyor auger is halted in B9 and a message "collecting container is full" is transmitted in B10. Next, the automated filling procedure is shut off entirely in B11. The signal B8 also has a "no" loop, which causes the filling procedure in the rear region of the collecting container to be continued until the maximum fill level has been reached.

Proceeding from the query in B3, the "no" path opens a further procedure, which is parallel to that described above. That is, a determination is made in B12, if the conveying direction of the conveyor auger is "toward the back" and a signal indicates that the collecting container is not yet full in the rear, whether to switch on the conveyor auger toward the rear or to maintain this conveying direction (see the "yes" path), thereby attaining the state "conveyor auger toward the rear is on" according to B13. If this is not the case, that is, if the collecting container may be full with consideration for this conveying direction of the conveyor auger, this query continues to take place by way of the "no" path according to signal B15. If it is confirmed by way of the "yes" path that the collecting container 8 is full at the rear, the filling procedure is likewise terminated in B9, B10 and B11.

Following B13, a query takes place once more in B14 as to whether the maximum fill level has been reached at the rear; if the path is "no", the filling procedure is continued. If the path of the signal B14 is "yes", the check is continued by way of B15. In B15 a routine query is made as to whether the maximum fill level has also been reached at the front. If so, operation of the conveyor auger is halted in entirety by way of the "yes" path and, subsequently, by way of B9, B10 and B11. By way of the "no" path of B15, the state "conveyor auger toward the front is on" is attained. In association therewith, the check is carried out in B17 as to whether the fill level is "front=full". In this case as well the related filling procedure is continued until this state has been reached. The procedure is then terminated according to B9, B10 and B11. In conjunction with the details of this filling procedure, reference is likewise made to the explanations in the list of reference signs.

In both the system and method, the collecting container is advantageously operated in a fixed position with respect to the combine harvester 1. The grain tank discharge pipe 4 is likewise moved into an appropriate feed position at the beginning of the grain tank unloading process. The filling device, which preferably comprises at least one conveyor auger 15, distributes the crop in an optimal manner in the collecting container 8 and a message is transmitted by way of sensors 18, 27 when the collecting container 8 has been completely filled. Moreover, it is advantageous that a grain tank unloading process can take place behind the front harvesting attachment 2 of the combine harvester 1, and that, when the chopper 5 is activated, the chopped material is distributed in such a way that it is not conveyed into the track of the tractor 15 and the collecting container 8 connected thereto. In addition, a plurality of monitoring functions are provided, which ensure that the entire crop stream 7 is fed to the collecting container and distributed thereon in an optimal manner even under unfavorable conditions.

The following list of reference signs of various elements mentioned above is included (as follows), for ease of explanation:

1 combine harvester
2 front harvesting attachment
3 grain tank
4 grain tank discharge pipe
5 chopper
6 outlet chute
7 crop stream
8 collecting container
9 base
10 side panel
11 ground drive of 8
12 radio link
13 stalk crop stand
14 tractor
15 conveyor auger
16 conveyor trough
17 outlet regions
18 fill level sensor
19 distance sensors
19a guide device
20 adjusting element
20a spreading width
21 loading funnel
22 Trac vehicle
23 rear loading surface
24 intermediate storage unit
25 intermediate conveyor
26 lateral loading funnel
27 sensor
28 sensor
29 ultrasonic sensor
30 camera
S1 automated grain tank unloading process is on
S2 adjust the grain tank discharge position off
   A1 unload the grain tank behind the front harvesting attachment
   A2 unload the grain tank next to the front harvesting attachment
S3 Is the grain tank unloaded in position A1 during chopping operation?
S4 Is the grain tank unloading position "off" or A2 and distribution of chopped material is reduced?
S5 normal distribution of chopped material
S6 reduced distribution of chopped material
S7 Determine the status of the collecting container and the status of the combine harvester grain tank unloading process
S8 Has the grain tank unloading process been released for the combine harvester and the collecting container?
S9 grain tank unloading process "on"
S10 determine the status of the collecting container and the combine harvester grain tank unloading process
S11 Has the grain tank unloading process been released for the combine harvester and the collecting container?
S12 grain tank unloading process is "off"
S13 CEBIS message: (depending on the status message) grain tank unloading process "off", collecting container "full", "not" in the grain tank discharge position, grain tank unloading process "interrupted"
B1 automated filling process is "on"
B2 set the initial direction of conveyance of the conveyor auger
   position 1—toward the front
   position 2—toward the rear
B3 Is the conveying direction=1 and the sensor for the front fill level=not full?
B4 conveying direction of the conveyor auger toward the front is "on"
B5 Is the sensor for the front fill level=full?
B6 Is the sensor for the rear fill level=full?
B7 conveying direction of the conveyor auger toward the rear is "on"
B8 Is the rear fill level="full"?
B9 operation of the conveyor auger is "off"
B10 message "collecting container is full"
B11 "off"
B12 Is the conveying direction of the conveyor auger=2 and rear=not full?
B13 conveying direction of the conveyor auger toward the rear is "on"
B14 Is the sensor for the rear fill level="full"?
B15 Is the sensor for the front fill level="full"?
B16 conveying direction of the conveyor auger toward the front is "on"
B17 Is the front fill level="full"?

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A harvesting device comprising
   a self-propelled combine harvester (1); and
   a drivable collecting container (8) equipped with a drive unit, which collecting container (8) is positioned relative to the harvester (1) and moved in parallel therewith, and to which crop is fed directly or indirectly from the harvester (1) during the harvesting operation by way of a grain tank discharge pipe (4) extending from a grain tank (3) of the harvester (1) and equipped with an outlet chute (6)
   wherein the collecting container (8) is moved in a constant position relative to the harvester (1) by way of a control device while the crop is conveyed,
   wherein the collecting container (8) comprises a filling device configured to uniformly distribute the crop in the collecting container (8)
   wherein a front harvesting attachment (2) is disposed on the harvester (1) having a lateral extension that extends beyond the harvester (1) on both sides, and the collecting container (8) assumes a position substantially within an extension of the front harvesting attachment (2) during conveyance of the crop by way of the grain tank discharge pipe (4), wherein the harvester (1) comprises a chopper (5) having an adjustable guide device (19a) for adjusting a width of straw and chaff distribution, and wherein, on the basis of a signal transmitted from the collectin container (8), the guide device (19a) is moved automatically into a position in which the width of the distribution is reduced on one side such that the guide device (19a) lies outside of a driving path of the collecting container (8).

2. The harvesting device according to claim 1, wherein both the harvester (1) and the drive unit (14, 22) of the driveable collecting container (8) comprise a navigation system, which together enable the harvester (1) and the drive unit (14, 22) to be held in a constant position relative to one another while the crop is being conveyed.

3. The harvesting device according to claim 1, wherein the filling device of the collecting container comprises at least one longitudinal conveyor acting in the longitudinal direction of the collecting container (8).

4. The harvesting device according to claim 3, wherein the longitudinal conveyor is in the form of at least one conveyor auger (15) or a chain conveyor.

5. The harvesting device according to claim 3, wherein the longitudinal conveyor is disposed in a conveyor trough (16).

6. The harvesting device according to claim 3, wherein, while the crop is being conveyed, the outlet chute (6) of the grain tank discharge pipe (4) assumes an approximately central position with respect to a longitudinal extension of the collecting container (8), and at least two longitudinal conveyors acting in opposing conveying directions extend from this position.

7. The harvesting device according to claim 3, wherein the collecting container (8) comprises a loading funnel (21) at one of the ends thereof, from which the longitudinal conveyor extends.

8. The harvesting device according to claim 3, wherein the drive unit is a device carrier, on the loading surface (23) of which an intermediate storage unit (24) is disposed, which is connected by way of an intermediate conveyor (25) to an inlet region of the longitudinal conveyor disposed in the collecting container (8).

9. The harvesting device according to claim 3, wherein sensors (18) for monitoring a fill level of sectors of the collecting container (8) assigned thereto are mounted in the upper edge region of the collecting container (8), by way of which the longitudinal conveyor can be controlled.

10. The harvesting device according to claim 1, wherein a camera (30) is mounted at the grain tank discharge pipe (4) or at the outlet chute (6) thereof and connected to a monitor provided in a cab of the harvester (1).

11. The harvesting device according to claim 3, wherein in a feed region of the longitudinal conveyor, an ultrasonic sensor (29) for monitoring the entry of the crop from the outlet chute (6) into the longitudinal conveyor is mounted at the collecting container (8) and is connected to a monitor or a navigation system controlling the position of the collecting container.

12. The harvesting device according to claim 8, wherein the device carrier is a track-drive vehicle (22).

13. A harvesting device comprising:
a self-propelled harvesting machine (1); and
a drivable collecting container (8) equipped with a drive unit positioned relative to the harvesting machine (1) and moved in parallel therewith, and to which crop is fed directly or indirectly from the harvesting machine (1) during the harvesting operation by way of a feed pipe (4) equipped with an outlet chute (6),
wherein the collecting container (8) is moved in a constant position relative to the harvesting machine (1) by way of a control device while the crop is conveyed,
wherein the collecting container (8) comprises a filling device configured to uniformly distribute the crop in the collecting container (8),
wherein a front harvesting attachment (2) is disposed on the harvester (1) having a lateral extension that extends beyond the harvester (1) on both sides, and the collecting container (8) assumes a position substantially within an extension of the front harvesting attachment (2) during conveyance of the crop by way of the feed pipe (4),
wherein the harvester (1) comprises a chopper (5) having an adjustable guide device (19a) for adjusting the width of straw and chaff distribution, and
wherein, on the basis of a signal transmitted from the collecting container (8), the guide device (19a) is moved automatically into a position in which a width of the distribution is reduced on one side such that the guide device (19a) lies outside of a driving path of the collecting container (8).

14. A harvesting device comprising:
a self-propelled harvesting machine (1); and
a drivable collecting container (8) equipped with a drive unit, which collecting container (8) is positioned relative to the harvesting machine (1) and moved in parallel therewith, and to which crop is fed directly or indirectly from the harvesting machine (1) during the harvesting operation by way of a feed pipe (4) equipped with an outlet chute (6), having a device for loading said collecting container in a uniform manner,
wherein the collecting container (8) is moved in a constant position relative to the harvesting machine (1) by way of a control device while the crop is conveyed,
wherein the collecting container (8) comprises a filling device configured with at least one longitudinal conveyor disposed in a conveyor trough (16) and acting in the longitudinal direction of the collecting container (8) to uniformly distribute the crop in the collecting container (8), and
wherein in a feed region of the longitudinal conveyor, an ultrasonic sensor (29) for monitoring the entry of the crop from the outlet chute (6) into the longitudinal conveyor is mounted at the collecting container (8) and is connected to a monitor or a navigation system controlling the position of the collecting container.

* * * * *